Aug. 29, 1967          W. L. GOFFE          3,338,710

FROST THERMOGRAPHY

Original Filed May 8, 1962          3 Sheets-Sheet 1

INVENTOR.
WILLIAM L. GOFFE
BY Ronald Zibelli
        Stefan J. Klauber
ATTORNEYS Aug. 29, 1967 W. L. GOFFE 3,338,710
FROST THERMOGRAPHY
Original Filed May 8, 1962 3 Sheets-Sheet 2

INVENTOR.
WILLIAM L. GOFFE
BY Ronald Zibell
Stefan J. Klauber
ATTORNEYS

Aug. 29, 1967   W. L. GOFFE   3,338,710
FROST THERMOGRAPHY
Original Filed May 8, 1962   3 Sheets-Sheet 3

INVENTOR.
WILLIAM L. GOFFE
BY Ronald Zibelli
Stefan J. Klauber
ATTORNEYS

United States Patent Office 3,338,710
Patented Aug. 29, 1967

3,338,710
FROST THERMOGRAPHY
William L. Goffe, Webster, N.Y., assignor to Xerox Corporation, Rochester, N.Y., a corporation of New York
Continuation of application Ser. No. 461,871, June 7, 1965, which is a continuation of application Ser. No. 193,131, May 8, 1962. This application Dec. 23, 1966, Ser. No. 604,342
2 Claims. (Cl. 96—1.1)

This invention relates to xerography and more particularly to novel electrostatic methods of forming visible patterns.

This application is a continuation of my copending application Ser. No. 461,871, filed June 7, 1965, for "Electrostatic Frosting." The latter is in turn a continuation of my copending application Ser. No. 193,131, filed May 8, 1962, for "Electrostatic Frosting."

In the usual forms of xerography an electrostatic latent image is formed by the combined action of an electric field and a pattern of light and shadow on a photoconductive insulating layer. The latent image is immediately, subsequently, or in some cases simultaneously, converted into a visible image by the selective attraction, repulsion, or redistribution in image configuration of finely divided solid or liquid particles.

A variety of xerographic methods are known which generally conform to the above description and which enjoy widespread commercial use as well as being fully described in various patents and other publications. Methods are also known in which an image is electrostatically reproduced as surface deformations in a continuous layer of material, but such methods have required high vacuum systems to form the image, complex optical systems to view the image, and have lacked the ability to reproduce continuous tone images.

Now in accordance with the present invention, there is provided a new form of xerography in which an electrostatic pattern is used for selectively frosting in image configuration a continuous deformable film or layer. Further, in accordance with the present invention, there is provided a xerographic imaging method which is inherently adapted to the reproduction of continuous tone as well as line copy images.

The various features, advantages, and limitations of the invention will become apparent from the following description and drawings, in which.

Figure 1A:
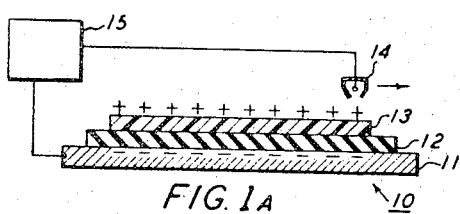
FIG. 1 is a partially schematic representation of the steps in carrying out one embodiment of the invention.

FIG. 1 illustrates schematically the process steps involved in carrying out one embodiment of the invention. FIG. 1A shows charging of xerographic plate 10 comprising support member 11 (which may be omitted in some cases), a layer of photoconductive insulating material 12 and deformable layer 13. Support member 11 is generally and preferably an electrical conductor or a supported electrically conductive layer in contact with photoconductive insulating layer 12. It may thus comprise, in accordance with conventional xerographic usage, such material as aluminum, brass, or other metals, metallized paper or paper with a relatively high moisture content, glass with a transparent or other conductive coating, or like known layer. Support layer 11 may comprise a non-conductor as is taught in the art in which case some of the manipulations described herein are modified in accordance with the knowledge of the art. Layer 12 may comprise the various photoconductive insulating materials known to be useful in the art of xerography. Such materials preferably include vitreous layers such as selenium, sulfur, or anthracene and other organic photoconductors as well as dispersions of photoconductive pigments such as zinc oxide in various resins or other electrically insulating binder materials. Layer 12 is generally characterized as being a good electrical insulator capable of maintaining a surface charge in the dark, but becoming substantially more conductive when illuminated by visible light, X-rays, or other forms of activating radiation. Thus, it may also comprise an insulating layer which becomes more conductive upon undergoing a photochemical reaction such as those described in Canadian Patent 618,521. For illustrative purposes only, layer 12 may be considered to be a layer of vitreous selenium 20 microns in thickness. Vitreous selenium layers are more fully described in Bixby U.S. Patent 2,970,906. Layers 11 and 12 should preferably be very smooth.

Layer 13 comprises a thin layer of material which is normally solid and electrically insulating but which may be temporarily softened by the application of heat, solvent vapors, or the like. Layer 13 may be opaque when viewed by reflection only, otherwise it should be and normally is transparent. In a further embodiment, it may comprise a layer of highly viscous insulating material. For illustrative purposes only, layer 13 may be considered a layer of thermoplastic resin approximately 2 microns thick. Layer 13 should also be very smooth.

As further shown in FIG. 1A, plate 10 is electrostatically charged by moving it relative to a corona charging device 14 which is connected to a high voltage power supply 15. Corona charging devices are well known in the xerographic art and suitable ones are described, for example, in U.S. Patents 2,777,957 and 2,836,725. Other methods of applying a uniform potential onto an insulating surface are known and may be employed. In accordance with conventional xerographic practice, a potential of about 800 volts, generally positive, may be applied to plate 10. The total potential difference applied is divided between layers 12 and 13 inversely as the ratio of their capacitances per unit area. Most of the potential will generally appear across photoconductive insulating layer 12 because, even though it has a higher dielectric constant than layer 13, it is sufficiently thicker so as to have a lower capacitance per unit area.

Figure 1B:
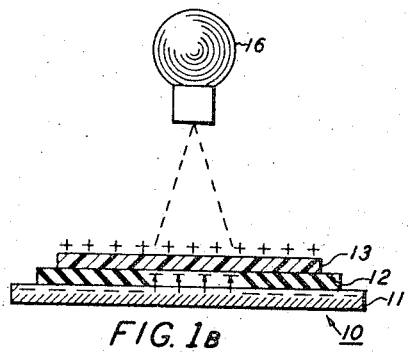
Figure 1C:
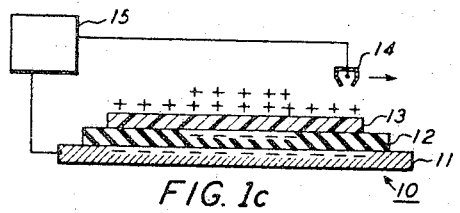

The next step is exposure of plate 10 to a pattern of light and shadow and is illustrated in FIG. 1B. If support member 11 is transparent, exposure may be made through member 11. Exposure may be made by means of a photographic enlarger 16, as ilustrated, or in a camera, or by contact exposure or other means. Where struck by light, photoconductive insulating layer 12 becomes electrically conductive and permits the charges bound at the interface between layer 12 and support member 11 to migrate to the interface of layer 12 and layer 13. Such charge migration does not lower the electric field in layer 13 but does locally lower the potential at the surface of layer 13.

The next step, as shown in FIG. 1C, is to again charge the surface of layer 13 to a uniform potential, which is usually the same potential as was applied in connection with FIG. 1A. In areas of previous exposure, and thus of internal charge migration, the surface of layer 13 accepts additional charge as indicated in the figure. While the surface of layer 13 is once again an equipotential surface, the electric field is now greatly increased in regions of layer 13 corresponding to illuminated areas and the electrostatic energy in these areas is likewise increased, while unexposed areas retain only the original charge. If desired, plate 10 may again be exposed in register to the same pattern of light and shadow and again be recharged to a uniform potential. This produces a somewhat higher field in layer 13 in exposed areas and by repeating this process several times, it is possible to create in the exposed areas of layer 13 an electric field virtually equal to the entire potential applied to the surface thereon divided by the thickness of layer 13. Nevertheless, a single exposure step is all that is ordinarily required or desired. Instead of recharging to the same potential as applied in FIG. 1A, layer 13 may be brought to zero potential, which creates smaller fields, or may be recharged to the opposite polarity, which creates the greatest fields in un-illuminated areas.

Figure 1D:
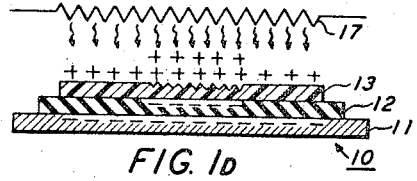

The next step is to temporarily soften deformable layer 13 so that it becomes physically altered by the mechanical forces associated with the electrostatic pattern thereon. Any softening method may be employed provided it does not increase the electrical conductivity of layer 13 sufficiently to cause the electrical charges thereon to leak away or become dissipated. The most common methods of softening are either to expose layer 13 to an atmosphere of solvent vapors for the materials of layer 13 or to heat it. The latter method is illustrated in FIG. 1D wherein plate 10 is shown positioned beneath heating element 17. As the material of layer 13 is softened, it is enabled to flow in response to the electrostatic forces acting upon it. As shown in FIG. 1D, the surface of layer 13 in areas of high field develops a microscopically uneven surface which can also be described as rippled, stippled, reticulated, wrinkled, or frosted. This local deformation, referred to in this specification and in the claims as frosting, causes layer 13 to take on a milky appearance in proportion to the amount of illumination received in different areas and thus represents a form of continuous tone reproduction. This localized deformation occurs, it is believed, because the electrostatically charged surface of layer 13 is inherently unstable, i.e., the layer is in a lower energy condition when in a frosted or roughened condition than when smooth. The probable explanation of frosting and requirements therefor will be discussed at greater length later on.

The next processing step is to reharden layer 13 thereby freezing the frost surface pattern in place. This can be accomplished for example, by removing the source of heat, solvent vapor or the like used to soften deformable layer 13. It is generally desired to reharden layer 13 as soon as the frosted pattern appears. Heat softening generally permits quicker rehardening. Excessive softening or excessively prolonged softening of layer 13 is also to be avoided because it may cause a loss of the image pattern. Deformation of layer 13 is caused by electrostatic forces exerted by charges at the surface of the layer. Excessive softening of the layer permits these charges to flow through the layer thereby destroying the image producing forces or at least the frost producing forces. Certain materials with sharp melting points, such as certain waxes, are therefore poorly suited for layer 13 because it is impractical to bring them to a viscous as opposed to watery condition.

Figure 1F:
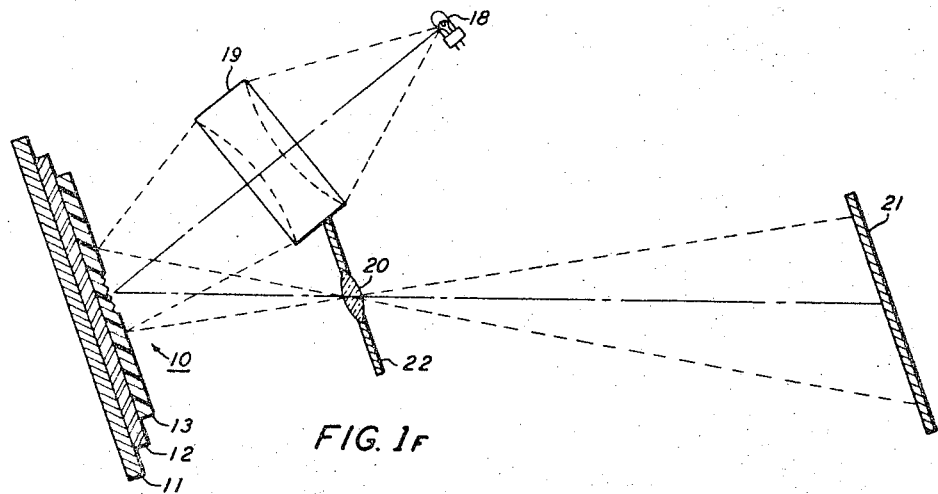
Figure 2A:
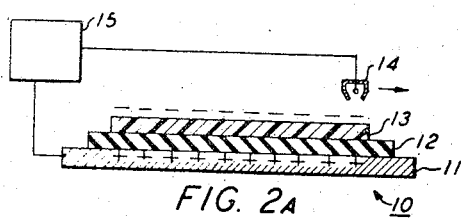
FIG. 2 is a partially schematic representation of steps involved in carrying out another embodiment of the invention.
Figure 2B:
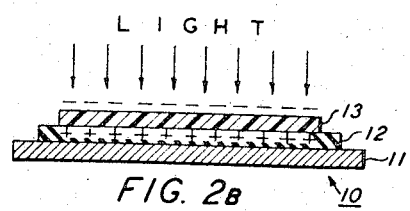
Figure 2C:
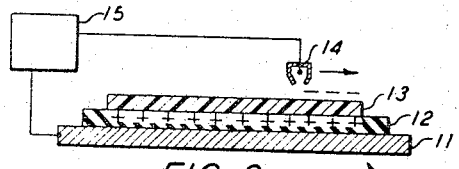
Figure 2E:
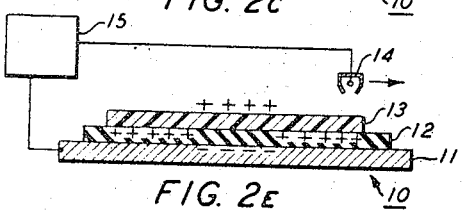
Figure 2D:
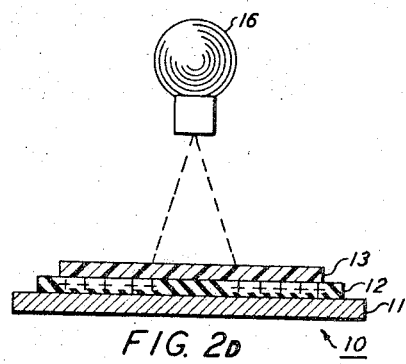

The frosted image produced by the foregoing procedure may be examined simply by looking at plate 10, but may also be efficiently utilized in a projection system such as that shown in FIG. 1F. A light source 18 and condensing system 19 direct a converging beam of light onto plate 10 which in turn specularly reflects this light onto a projection lens 20. The optical relations are such that condensing system 10 images light source 18 onto lens 20, while lens 20 images plate 10 onto a projection screen 21. There is thus formed a brilliant projected image of the smooth surface areas of plate 10, on screen 21. Frosted areas of plate 10, however, scatter light rather than specularly reflecting it and this scattered light is not imaged on screen 21 by lens 20. A shield 22 may be provided surrounding lens 20 to prevent scattered light from reaching screen 21. FIG. 1F depicts one form of apparatus in which deflected light is prevented from reaching a viewing position while undeflected light is used to form the image. Frosted areas may show a density on the order of 1.5 in such apparatus.

A Schlieren optical system may also be employed. The frosted images of the present invention, however, produce gross scattering or deflection of light and therefore do not require the use of a relatively sensitive, complex and expensive Schlieren optical system. Where the various layers comprising plate 10 are transparent, as for example where glass support members and transparent photoconductors are employed, the frosted image may also be viewed by transmitted light methods, including the use of conventional slide projectors or the like. The narrower the cone of light accepted by the optical system, the greater will be the density of the image.

Where a permanent frost image is required, the foregoing process steps complete this embodiment of the invention. Ofter, however, it is desired to reuse plate 10 and it becomes necessary to erase the image therefrom. This can be done by employing the same procedures which may be used for softening layer 13 in the first place. Thus, layer 13 may again be heated or exposed to solvent vapors, preferably in the presence of light. The light causes dissipation of charges in photoconductive insulating layer 12 while extensive softening of layer 13 also permits diffusion and neutralization of charges thereon and permits surface tension forces to restore the surface of layer 13 to a smooth condition. It may also be noted that many materials usable for layer 13, while nominally solid, have sufficient flow properties in their normal state that frosted images formed thereon in accordance with the foregoing procedures will smooth out and disappear of themselves in several hours or less. Where repetitive processing is contemplated, it is particularly important to keep dust particles away from layer 13, as such particles can produce permanent distortions in layer 13.

Various modifications of the above method steps may be employed for the creation of frosted images without departing from the present inventive concept. One simple modification makes use of the fact that a softened deformable layer may remain in a softened condition for periods ranging up to several minutes or more. This is particularly true where softening is accomplished by the vapors of high boiling liquids, or where heat softening is employed and plate 10 has a large thermal mass. When layer 13 remains soft for a reasonable length of time, it is possible to soften it at least before exposure to the image pattern of light and shadow, rather than afterwards. Layer 13 will then remain soft long enough after image exposure to permit frosting to take place for immediate viewing or projection if desired or for utilization after freezing if desired.

Another procedural embodiment of the invention is schematically illustrated in FIG. 2. Plate 10 may be the same as that described in connection with FIG. 1, and the first step is to electrostatically charge plate 10 as shown in FIG. 2A. In this embodiment, the initial charge is illustratively of negative polarity, but it is understood that all polarities shown may be replaced by their opposites. The next step is to expose the plate to light, such as ordinary room illumination. This causes photoconductive insulating layer 12 to become electrically conductive and causes the induced positive charges previously at the interface between layers 11 and 12 to move to the interface between layers 12 and 13 as shown in FIG. 2B. Following this, plate 10 is returned to darkness and is electrostatically charged with just sufficient positive charge to substantially neutralize the negative charge previously on the surface of layer 13. This second charging is illustrated in FIG. 2C and may be performed by the same apparatus shown in FIG. 2A with appropriate adjustments. The next step shown in FIG. 2D is to expose plate 10 to a pattern of light and shadow thereby dissipating in illuminated areas the positive charges trapped at the interface between layers 12 and 13. The next step, shown in FIG. 2E, is to again apply a positive charge to plate 10, thereby bringing its surface to a uniform positive potential, typically on the order of several hundred volts. There is thus formed in layer 13 an electric field pattern corresponding to the pattern of light and shadow. Further processing to convert the electric field pattern into a frosted surface can be carried out exactly as described in connection with FIG. 1. As should be apparent in connection with this embodiment, the steps illustrated through FIG. 2C place a uniform charge at the interface of photoconductor 12 and layer 13 and other techniques to accomplish such charging as through induction or the like, may be employed.

In a still further embodiment of the invention, the step of softening layer 13 may be avoided by employing as layer 13 an electrically insulating material which is not strictly a solid, but exhibits some cold flow at room temperatures. Such materials when processed in accordance with any of the embodiments of this invention will slowly develop a frosted surface pattern without the use of heat or solvent and will retain the pattern for a period of time on the order of several hours.

Figure 3:
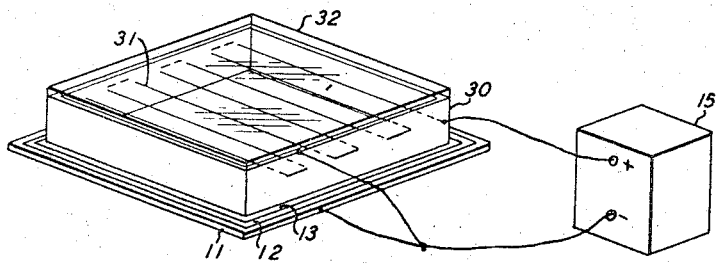
FIG. 3 is a perspective view of a form of apparatus for carrying out still another embodiment of the invention.

FIG. 3 shows a form of apparatus adapted for carrying out still another embodiment of the invention. It comprises an insulating framework 30, approximately 7/8" high which rests upon a xerographic plate 10, which may be the same form of plate shown in FIGS. 1 and 2. Stainless steel wire 31, .003" in diameter, is woven through frame 30 in horizontal rows 1/2" apart and spaced 1/2" above the bottom of frame 30 and 3/8" below the top thereof, which is covered with a sheet of electrically conducting glass 32. One terminal of power supply 15, capable of supplying a direct current potential up to about 10,000 volts, is connected to wire 31 and the other terminal is connected to support member 11 of plate 10 and conducting glass 32. Power supply 15 normally supplies 4500–5200 volts to wire 31. An enlarger 16 is positioned above framework 30 and is adapted to project a light image onto plate 10. Wire 31 is so small and so positioned that it does not cast a perceptible shadow on plate 10. The illustrated apparatus is capable of simultaneously exposing and charging a xerographic plate. Other forms of apparatus such as that shown in U.S. Patent 2,932,742 are similarly adapted and may be substituted for that shown.

The apparatus of FIG. 3 can be used in connection with the previously described embodiments of the invention, but is specifically adapted to an embodiment in which deformable layer 13 of plate 10 is first softened and plate 10 is then positioned as shown and simultaneously exposed to a pattern of light and shadow from enlarger 16 and to a corona discharge from wire 31 while layer 13 is still in a softened condition. This method produces the strongest tendency towards surface frosting of layer 13 of any method and consequently permits the widest choice of deformable materials for layer 13, of thicknesses of layer 13, and of softening solvents when such are employed. This method also produces optimum density, linearity, and resolution. The illustrated charging apparatus, in common with most although not all corona charging devices tends to charge a surface to a substantially uniform potential. Accordingly, in illuminated areas of plate 10 a higher electric field exists across layer 13, in much the same manner as illustrated in FIG. 1B. This causes incipient frosting to appear and thereby cause the electric potential in these areas to be reduced due to the decreased distance separating charges on opposite sides of layer 13. However, the charging apparatus immediately adds charge to these areas to restore their potential to its initial value, thereby restoring or even increasing the forces acting to promote frosting. Further deepening of the frost pattern again restores or increases the forces acting on these areas and the surface of deformable layer 13 rapidly takes on a frosted appearance in image configuration. It will be appreciated that while the foregoing procedure involves simultaneous charging and exposing of a plate bearing a softened layer, comparable results may be had by the repeated alternating charging and exposure of a xerographic plate bearing a softened deformable surface layer.

In accordance with a further embodiment of the present invention, the insulating deformable layer need not be coated on a photoconductive insulating layer but may instead be coated on or at least used in conjunction with any electrically conductive surface. Suitable substrates include metal sheets and foils as well as glass or heat resistant plastics such as polyethylene terephthalate, with a conductive coating thereover. An electrostatic charge pattern may be formed on the surface of the deformable insulating material by various methods including bringing an image bearing xerographic plate into close contact with the deformable layer or by bringing an uncharged xerographic plate into close contact with the layer and applying a pattern of light and shadow to the xerographic plate while a potential is maintained between the xerographic plate and the conductive substrate of the deformable layer. Methods are also known which do not involve xerographic plates or photoconductors. Suitable charge transfer techniques are disclosed, for example, in U.S. Patents 2,825,814; 2,919,967; and 3,015,304. A thin film of insulating oil may be present on the deformable layer to facilitate charge transfer. Such a film, if used, may be left in position during subsequent processing. If the strength of the charge pattern is within the limits to be set forth hereafter, the deformable layer may be softened and will give rise to the same surface frosting in charged areas as described in connection with the previous embodiments. Such frosting will again provide a visible replica of the charge pattern. In connection with this, and other embodiments of the invention, it is observed that charging, frosting, and other steps can be carried out in the presence of a very thin film of insulating liquid such as a silicone oil.

In accordance with the preceding paragraph, xerographic plates were prepared having both 20 micron and 50 micron layers of selenium coated on a transparent conductively coated glass base. Staybelite 10 resin, described later in the specification, was dissolved in toluene and wiped onto polished brass plates to form coatings approximately 1/2 micron in thickness. The coated side of the brass plates were spaced apart from the selenium plates by 1/4 mil, 1/2 mil, and 1 mil spacers and were also pressed into nominal contact with the selenium with and without an intervening film of silicone oil. D.C. voltages ranging from ±400 volts to ±1150 volts were applied between the brass plates and the conductive glass while the selenium was simultaneously exposed to an image pattern projected through the glass. Exposure times ranged from 1/60 of a second to several seconds. The brass plates were then removed from the selenium and placed coated side up on a hotplate until a frost pattern appeared and reached maximum resolution, which took about 10 seconds. The brass plates could also be softened just before charge transfer. In further experiments uniform electrostatic charges of both positive and negative polarities were applied to the coated side of the brass before it was placed near the selenium. Resolution of up to 34 lines per millimeter was achieved in these experiments as well as good continuous tone reproduction. When the thicker selenium layers were used, 400 volts was inadequate and higher voltages had to be used in order to obtain a frost pattern.

Figure 4:
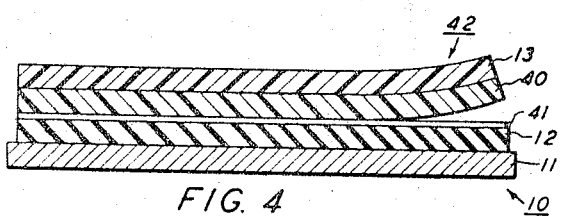
FIG. 4 is a diagrammatic representation of a further embodiment of the invention.

In another embodiment of the invention, the layer bearing the frosted image pattern can be removed from the insulating photoconductive layer. An illustration of this embodiment is shown in FIGURE 4. In order to permit separation of the layers, it has been found preferable to wipe or otherwise provide a thin coating 41 of silicone oil or other light oil or electrically insulating low viscosity liquid that does not chemically react with the other materials used. One oil used was Dow Corning Type DC–200 with 20 centistoke viscosity. Such an oil layer reduces the tendency for air bubbles to form permitting a more uniform contact between the photoconductive layer and the strippable layer. Since the frostable materials such as thermoplastics and other deformable layers discussed in this disclosure cannot be stripped without dimensional distortion, it also is necessary in this embodiment to provide a support material 40 in the strippable layer. Suitable support materials have been found to be transparent plastics such as polyvinyl chloride, polyvinyl acetate, and the like. A preferred material has been found to be polyethylene terephthalate due to its high dimensional strength in very thin layers. The thickness of support layer 40 has been found suitable within the range of ¼ mil to 2 mils. With thinner layers it is easier to make a uniform contact and obtain higher resolution; however, extremely thin layers have a tendency to wrinkle or to distort in other ways. Strippable layer 42 is formed by coating support layer 40 with the deformable coating of thermoplastic or like frostable material as disclosed elsewhere. The deformable coating material 13 may be coated on the support layer 40 by dip coating, whirl coating, wiping, or other conventional proceduces. In forming the image, strippable layer 42 is laid over the xerographic plate 10 and roller or wiped to assure uniform contact. The frost image pattern may then be formed in any of the ways previously disclosed. After formation of the frost image pattern, the strippable layer is simply pulled away from the xerographic plate providing a separate frosted image on a transparent backing. While it is usual that the materials used are transparent, it is also possible to dye support layer 40 so that the frost image is on a relatively opaque background. When the support layer is dyed to near opacity; the exposure of the xerographic plate is usually made through a transparent backing such as, glass with a conductive coating of tin oxide or the like. Opaque layers are particularly suitable where X-ray exposures are to be used since the opaque layer will protect the sensitized plate from ambient light while remaining relatively transparent to the X-rays. A preferred way for forminng a frost image on a strippable layer is to first charge xerographic plate 10, then strippable layer 42 is applied over the charged xerographic plate. Use of a conductive roller electrically connected to the substrate 11 of plate 10 and rolled under pressure over the strippable layer 42 as it is applied to the photoconductive insulating surface of plate 10 has been found advantageous in assuring good contact between the layers. Exposure, recharging, and development can then be performed simultaneously or separately as desired. Precharging of the selenium plate before application of the strippable layer increases the sensitivity of the process since it applies a high voltage to the xerographic plate alone without having it divided across the xerographic plate and the strippable layer. However, it is not necessary to use this precharging, and all charging has been performed with the strippable layer in position producing satisfactory results. In the absence of precharging the xerographic plate, a first charging step after the strippable layer has been applied helps tack the strippable layer to the xerographic plate with uniform contact. Where strippable layers are used, the additional thickness presented by the strippable support layer 42 makes it preferable to use slightly higher charging voltage than have been found suitable in the other embodiments disclosed.

The photoconductive insulating layer of a xerographic plate may itself be made to assume a frosted pattern. This greatly simplifies the frosting process since it allows the elimination of the second charging step. Thus, the formation of a frost image directly on a photoconductor requires only the steps of charging, exposure, and softening. In this case then, the photoconductor serves a dual purpose since it is used for both the formation of the electrostatic charge pattern and the frost pattern. Thus, a 20 micron selenium xerographic plate was charged to a potential of 600 volts, exposed to a pattern of light and shadow, and then heated for about 10 seconds at 60° C. This produced a frosted surface pattern in unexposed areas. Microscopic studies and X-ray diffraction proved that a purely physical deformation of the surface was involved. The plate may be heated to a higher temperature, causing erasure of the frost pattern and then reused in the above process. Other selenium thicknesses have been used including 2 microns.

Other photoconductive insulating layers can be used in connection with the embodiment of the previous paragraph. Ten parts by weight of the primarily ultraviolet sensitive organic photoconductor corresponding to Formula 2 of Canadian Patent No. 568,707 were mixed with 10 parts by weight of Vinylite VYNS (Union Carbide), 100 parts by weight diethyl ketone, and .01 part by weight Rhodamine B, a red water-soluble dye available from Du Pont. A solution was also prepared containing 1 gram of Staybelite 10 (Hercules Powder Co.) in about 2.4 cc. of toluene. Ten parts by volume of this latter solution were mixed with one part by volume of the former and the resulting mixture was wipe-coated on a brass plate and dried. The resulting layer was then electrostatically charged to about 600 volts and exposed to an ultraviolet pattern of light and shadow under normal room lighting conditions. The brass was then placed on a hotplate kept at a temperature of about 70° C. and a frost pattern appeared in about 15 seconds in unexposed areas. The above procedure was successfully repeated using only the photoconductor, Staybelite, and toluene. Piccolastic A–50 may be substituted for the Staybelite to form photoconductive layers which will frost at just above room temperature. Although this eliminated the softening step from the process, it was found that the layer erased itself, reforming its original smooth surface after a few hours, probably by the action of surface tension after the charge pattern had leaked away. One method of permanently freezing this type of frosted image comprises coating it with a layer of clear gelatin. A deformable photoconductor may also be coated on a deformable non-photoconductor. When frost is formed directly on the photoconductor, the simultaneous techniques described above in connection with FIG. 3 may be employed or the charging step may follow the exposure step if a photoconductor with high fatigue properties is employed as described below. Many organic photoconductors such as the one described above have suitable high fatigue properties. Many photoconductive insulators, although not usually selenium, continue to show very substantial conductivity for a long time after illumination. This effect is called "fatigue." This is also true of the materials described in the previously referenced Canadian Patent No. 618,521. With such materials, charging can be carried out after exposure, rather than before, in the various forms of the invention.

Figure 5A:
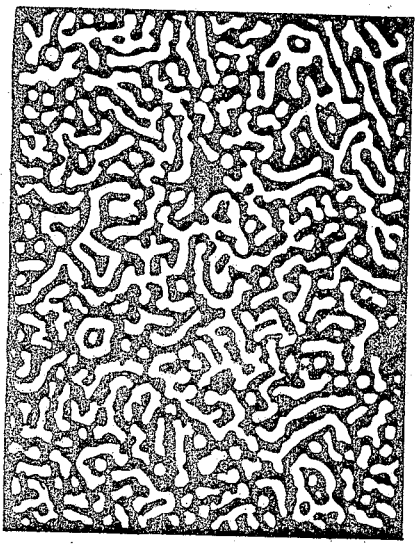
FIGS. 5A and 5B show frost patterns according to the invention.
Figure 5B:
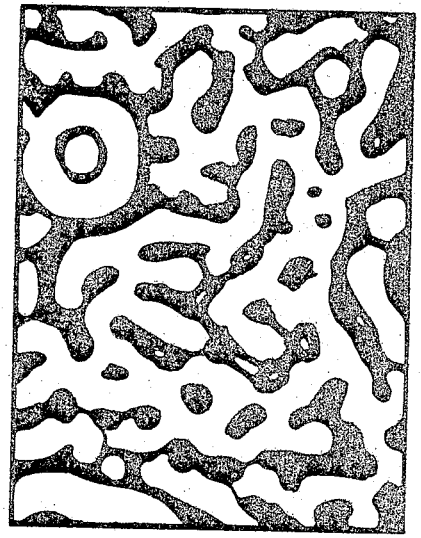

FIGS. 5A and 5B were drawn from 600× photomicrographs of different frost patterns. FIG. 5B is of a thicker layer than FIG. 5A. Black lines represent depressed areas. These patterns consist mostly of reasonably straight alternating lines or ridges and valleys which recur at a substantially uniform spacing, and have in the lengthwise direction a somewhat recurrently variable width and/or height with a periodicity about the same as the line-to-line spacing. The valleys can also be described as a series of overlapping circular depressions. The line-to-line spacing at the onset of frost has been found to be substantially equal to the thickness of the deformable layer only and the frost pattern bears very little relationship on the microscopic level to the configuration of the electrostatic pattern which causes it. With thin deformable layers on the order of a few microns or less, the line-to-line spacing increases to about five times the layer thickness as frosting becomes more pronounced. This effect diminishes with increasing layer thickness and at one hundred microns the line-to-line spacing is about equal to the thickness for any degree of frosting. It is believed that randomly occurring circular patterns are largely caused by dust particles or other localized imperfections in the deformation layer. If the deformable layer overlies a striated surface such as a buffed metal, the frost pattern will be largely parallel to the striations. The illustrated patterns are quite typical of the present invention and are in turn quite distinct from those formed in other electrostatic deformation processes. Such other processes tend to form either a pattern of lines following the contours of the electrostatic pattern or else a series of lines whose position as well as configuration are largely determined by discontinuities which exist or are produced in the deformable layer or to the discontinuities introduced at some point in the processing procedure. As will be described, the depth of the depressed areas is controllable and varies in accordance with the electrostatic pattern to produce a frosted pattern having continuous tone properties.

While the causes and mechanism of the frosting phenomenon are not completely understood, a theory has been proposed which appears to account for the observed phenomena and which conforms with the observed phenomena. The agreement between theory and observation is sufficiently close so that the theory may be used to predict critical limits of operability with adequate precision and may be used as a basis for distinguishing and defining the present invention without thereby limiting the invention.

In accordance with the proposed theory, deformable layers of the present invention may be treated as liquid layers having a relatively high viscosity. This viscosity during deformation is generally in the range of about $10^4$ to $10^6$ poises as measured in samples of bulk material heated to the temperature range which causes frosting in thin layers of the materials. Higher viscosities prevent electrostatic forces from causing any type of deformation within a reasonable time whereas lower viscosities apparently permit charges on the deformable layer to pass through the layer by some form of fluid transport mechanism. There is a surface tension force existing at the surface of the layer which tends to keep the layer in a smooth condition and which gives rise to a certain surface energy in the layer. Any electrostatic charge present on the layer gives rise to an electrostatic charge in the layer and additionally causes a spreading force on the surface due to the known repulsion of electric charges of like polarity. This tendency of the surface charges to spread apart tends to increase the surface area of the film whereas the surface tension force tends to reduce the surface area. When the charge on the film reaches a certain density, the repulsive forces due to the charge overcome the attractive forces of the surface tension and the film tries to increase its surface area. The only way it can do this is to form a series of folds or wrinkles which gives rise to the frosted appearance previously referred to. The critical condition for frosting is thus seen to be that the electrostatic repulsion forces must exceed the surface tension forces. It will be shown that this condition is met when the electrostatic energy per unit area exceeds the surface tension energy per unit area. It is also possible that surface charges have a certain lateral mobility and tend to flow into the depressed areas. This would also tend to promote frost.

Assume a uniform layer of dielectric, having a capacitance per unit area K, overlying a conductor. A charge Q is on the dielectric surface and is constrained to uniformly cover an area A. Neglecting fringe effects, the total electrostatic energy of the system is:

$$E = \tfrac{1}{2}QV$$

where V is the potential at the charged portion of the dielectric. Since:

$$V = \frac{Q}{KA}$$

then $$E = \frac{\tfrac{1}{2}Q^2}{KA}$$

Consider the charge to be confined in an area of unit width and a variable length. The change in total energy as a function of change of length is simply the force, tensile or compressive, acting on a line of unit length lying across the width of the charge. More generally, as with surface tension forces, the force is the derivative of surface energy with respect to surface area. Let F be the electrostatic surface force acting on the dielectric:

$$F = \frac{dE}{dA} = \frac{-\tfrac{1}{2}Q^2}{KA^2}$$

However, the electrostatic energy per unit area, is simply:

$$e = \frac{E}{A} = \frac{\tfrac{1}{2}Q^2}{KA^2}$$

Thus, the electrostatic surface force is repulsive and, in a consistent system of units, is numerically equal to the electrostatic energy per unit area, i.e., $$F = -e$$

Considering surface tension forces, similarly assume a liquid surface of unit width and arbitrary length. Since the surface tension force is constant, the surface energy due to surface tensions is the surface length times the surface tension. But the surface energy is independent of shape and more generally is the product of surface area and surface tension. Thus, the surface tension is numerically equal to the surface tension energy per unit area. If the surface tension is denoted by S, then the condition for frosting is $F > S$. Surface tension varies relatively little compared to other properties of materials and is generally in the neighborhood of about 40 dynes per centimeter.

Where an electrostatic charge is transferred to the surface of a deformable material it is apparent that the charge or the potential must meet the foregoing requirements. Where a procedure such as that of FIGURE 1 is employed, the surface potential may remain substantially uniform throughout before frosting. Nevertheless, the surface charge density varies in image configuration and the capacitance K likewise varies in image configuration. This is because the effective thickness of the dielectric layer is the distance from the surface to the image charges of opposite polarity. It is apparent in FIGURE 1 that this distance is much less in illuminated areas and thus the electrostatic repulsive forces in these areas is much greater.

It can also be seen that the voltage required to cause frosting varies directly with the square root of the thickness of the deformable layer. This requirement has been experimentally verified in a series of experiments using films of Piccolastic A–75 resin. The following frost thresholds were determined.

| Microns: | Volts |
|---|---|
| 2.5 | 70 |
| 7.0 | 105 |
| 13.5 | 135 |

Not only did the observed values conform to the square root requirement, but closely adhered to the calculated absolute voltages as well. Similar close correlation between experimental and theoretical results has been achieved in various other experiments as well, although with thicknesses on the order of 50 microns or more, threshold potentials tend to lie below the theoretical values. It should be noted that the threshold potential must be exceeded during softening, and not merely at some previous time. The occurrence of frosting is determined by the charge density or potential of a surface and frosting thus develops or makes visible solid areas rather than merely the boundaries separating charged and uncharged areas. The degree of frosting is also determined by these same quantities, thus making the present invention suitable for use with continuous tone images.

Figure 6A:
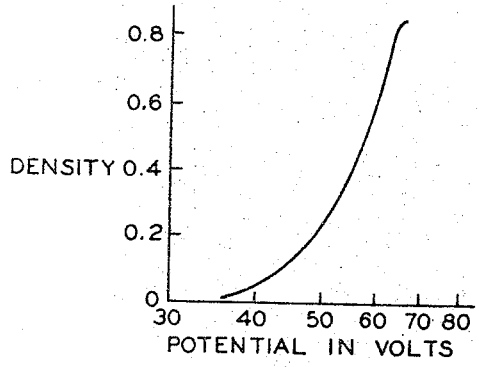
FIGS. 6A and 6B are curves relating density to voltage.
Figure 6B:
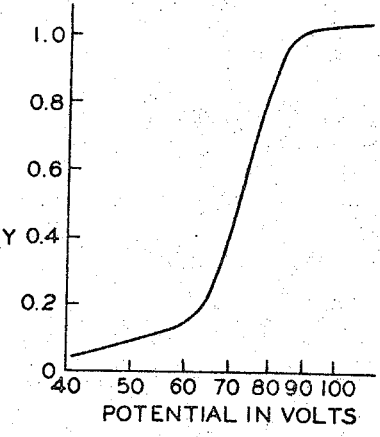

FIGURE 6A is a curve showing the relationship between the non-diffuse reflection density as a function of voltage applied to a deformable layer coated directly on polished brass. The particular deformable material was a ½ micron thick layer of Staybelite 10 resin. Electrostatic charge was applied directly to the layer from a corona device and the layer was then heated for 47 seconds to a temperature of 132° F. Frost density is also influenced by heating time, temperature, thickness, and various other factors much as the density of a photographic film is influenced by the type of film and the processing procedures as well as by the amount of exposure received. This is illustrated by FIGURE 6B which is the same as FIGURE 6A except that the heating time has been reduced to 30 seconds, resulting in higher maximum density and a curve of different shape.

As can be seen from FIGURE 6, the curves show considerable curvature at the bottom and a long toe portion, due to the presence of a definite threshold for frost. The upper portion of the curve exhibits a relatively sharp bend. Embodiments such as those of FIGURE 1 provide a minimum potential difference across all areas of the deformable layer and increase this potential in proportion to light exposure. Thus, such embodiments actually tend to use the linear portion of curves such as those of FIGURE 6 and tend to give high quality continuous tone reproduction. Other embodiments, such as those in which a photoconductive layer is itself softened and frosted, start out with a high potential difference across the deformable layer and selectively reduce this potential. If the initial potential is selected to be just high enough to give maximum frost density, the linear portion of the reproduction curve will again be employed and satisfactory continuous tone reproduction can be obtained although the tone values are the reverse of those obtained with embodiments such as that of FIGURE 1.

Other types of electrostatically caused deformation may take place in addition to the present, novel effect. Thus, fringing fields are known to exist at the edge or boundary separating charged and uncharged areas and these fields are capable of causing a liquid or deformable layer to form a relief pattern at such boundaries. Such patterns are usually not desired when the present invention is practiced and can generally be eliminated or minimized by softening the deformable material just sufficiently and just long enough for the frost pattern to appear. Over-softening tends to erase frost more readily than boundary relief. The frost pattern forms more strongly than boundary-relief if photoconductive insulating layer 12 is no more than about 20 microns in thickness and the deformable layer is no more than a few microns. If softening is excessive or carried out for too long a time, a relief pattern may appear. It is to be noted in connection with an embodiment such as that of FIGURE 1, that excessive time or degree of softening will permit the surface charges to diffuse through the deformable layer thus removing the electrostatic forces which cause frosting. However, these charges, now present at the interface between the deformable layer and the photoconductor, are still capable of producing a boundary deformation of the deformable layer.

The methods of the present invention may be carried out with a wide variety of materials and structures. Thus, while the invention has been principally described in terms of a specific form of a xerographic plate covered with a deformable layer of specific thickness, this was done for illustrative purposes only. The invention can be carried out with any form of xerographic plate known to the art and which is useful for more conventional forms of xerography. Thus, the photoconductive insulating layer 12 may comprise vitreous selenium but it may also comprise other vitreous photoconductive insulating materials or other classes of photoconductive insulating materials such as dispersions of photoconductive pigments in film forming electrically insulating binders. Organic photoconductors, as described for example in the previously referenced Canadian Patent 568,707, are very suitable. A transparent support member may be employed and such a plate may be exposed through the back. The thickness of layer 12 is likewise subject to substantially variations as are known to the art, although a thickness of 20 microns or less is generally preferred for the reasons given. Layer 13 may be firmly attached to its support or may be loosely adherent and strippable therefrom through the use of a very thin interlayer of poorly adherent material as illustrated in FIG. 4. Layer 13 may also have a thickness lying within a broad range. In general, however, it has been found that surface frosting does not take place, or at least is not readily observable, when layer 13 is much less than ½ micron in thickness. As layer 13 is increased in thickness, the frosted areas change in appearance from a very fine-grained frosting to a relatively coarse grained bubbly appearance and eventually becomes difficult to observe in the presence of naturally occurring surface imperfections. Frosting has, however, been observed with layers in excess of 100 microns thickness. Resolution as high as 46 lines per millimeter has been obtained with such thin layers. Resolution is obviously higher with fine-grained frosting and layer 13 should preferably be in the range of about 1 to 6 microns in thickness.

Where deformable layer 13 is to be softened by heating, it may comprise, for example, almost any electrically insulating thermoplastic resin capable of being softened at a moderate temperature and retaining an electrostatic charge at such a temperature. While the invention has been described in terms of materials which are solid at room temperature and which are temporarily softened by heating or the like, it can also be carried out with materials which are viscous at room temperatures but which can be solidified by cooling when required, and can also be carried out with materials that harden or polymerize by heating. Some photoconductive insulating layers 12 are heat susceptible and may be damaged by too prolonged exposure to heat or by exposure to intense heat. Thus, selenium should not be exposed to temperatures over 130° F. for extensive periods. Where such a material is being used as the photoconductive layer, care should be exercised in choosing the insulating material and in applying heat to avoid damage to the photoconductive layer. However, other photoconductors will tolerate higher temperatures and some forms of the invention do not require the presence of a photoconductor during frosting. Conventional plastics such as polyvinyl chloride, polyvinyl chloride-acetate, or polymethyl methacrylates have excessive softening temperatures and are generally not suitable for layer 13 at least in their usual high molecular weight forms. When, however, layer 13 is to be softened by the application of solvent vapors, various other requirements appear. The principal requirement is then that layer 13 be capable of absorbing sufficient quantities of a suitable solvent vapor in order that its viscosity be lowered to the point where frosting can take place.

A reasonably suitable testing procedure comprised measuring the viscosity of a 50% solution of a prospective resin or other material and measuring the solution viscosity. In general, it has been found that the viscosity of such a solution should be in the order of not more than one stoke although a single exception has been found in the case of Piccoflex 100A, a polyvinyl chloride resin manufactured by the Pennsylvania Industrial Chemicals Company. This material has a solution viscosity of 22 stokes but yields a good frosted image although frosting takes place relatively slowly. It has been found in general that harder, higher-melting materials give more permanent images.

The solution viscosity test is not completely reliable because the amount of solvent vapor absorbed by deformable layer 13 depends on the solvent and the material employed for layer 13 and this amount is generally much less than 50%. Most of the resins of the type mentioned as suitable for heat softening rather than vapor softening can hardly be prepared in 50% solutions as they are scarcely wet by this amount of solvent. Layer 13 can be applied to plate 10 by slowly drawing the plate from a solvent solution of the coating material, by forming layer 13 in the form of a film and then adhering this film to plate 10, or by other known means.

Another significant factor affecting the performance of layer 13 is its ability to accept and retain an electrostatic charge. This ability can conveniently be tested, for example, by depositing a 5 micron coating of the material in question on a piece of steel and applying a charge to the piece of coated steel. The corona charging unit of the Model D Processor unit, available from Xerox Corporation, Rochester, N.Y., may be employed for this purpose. This unit is normally adjusted so as to deposit a positive charge of about 400–600 volts on a conventional 20 micron thick selenium xerographic plate. The charge deposit by this or similar apparatus on the coated steel plates can be measured with a suitable electrometer. It has been found that materials accepting a charge of less than about 300 volts are not satisfactory for producing frosted images. It is particularly important that layer 13 be capable of retaining an electrostatic charge while in a softened condition. Many materials will not meet this requirement although they may show a very high electrical resistance as measured between electrodes. It is believed that no materials meet this requirement when they are in a watery, as opposed to viscous condition. Hexane, for example, is a low viscosity fluid with a very high resistivity, but it will not retain a surface charge.

The solvent used for softening layer 13 also has a significant effect on the extent to which frosting occurs. The solvent vapors should be absorbed by layer 13 in sufficient quantity to substantially lower the viscosity of layer 13 and the volatility of the solvent should be chosen where possible to provide a suitable hardening time for layer 13. These solvent characteristics are those which would be obvious to a chemist but the electrical properties of the solvent also play a significant role in influencing image frosting. In the solvent softened condition, layer 13 may actually comprise a substantial amount of solvent and the dielectric constant and resistivity of layer 13 is determined to some extent under these conditions by the dielectric constant and resistivity of the solvent, particularly since there is generally no great variation in dielectric constant among the various solid materials comprising deformable layer 13. Solvent liquids, on the other hand, show a great variation in dielectric constant and resistivity. Typical examples of the dielectric constants of certain solvents useful in connection with image frosting are perchloroethylene 2.3, trichloroethylene 3.4, and ethylene dichloride 10.0. As is apparent from the previous discussion in connection with FIG. 1, where the solvent is applied after the various charging steps have taken place, the lower the dielectric constant of layer 13 the greater will be the electrostatic forces thereacross. It would thus appear desirable to use a solvent liquid having as low a dielectric constant as possible and experiments confirm that best results and most rapid frosting are obtained by using a solvent having a dielectric constant not greater than about that of trichloroethylene, i.e., 3.4.

Since deformable layer 13 is very thin, it should be reasonably stable against oxidation or other changes. Even when the bulk resin or other material exhibits suitable properties, layer 13 may lose its ability to form frost images after a period of several days. It is believed that this is due to oxidation or some other form of hardening of the layer so that it no longer softens at a low enough temperature to retain the necessary electrical resistance. It is generally desirable therefore to use a recently prepared layer 13 for best results. This is particularly true of the Staybelite materials to be described, which may require as much as 150° C. to frost after aging. Hardening of the layer may be accelerated by heating, which is normally to be avoided. However, a layer of Staybelite or other material may be employed without a photoconductor and be heated in image configuration by, for example, passing the layer through a thermal-type copying apparatus in contact with a printed original or by projecting an infrared image on the layer. If the layer is subsequently electrostatically charged and softened, it will preferentially frost in areas not previously heated.

Many materials have been found which are suitable for forming layer 13 and which are suitable for use with solvent vapor softening procedures as well as with heat softening. Table I below, is a partial list of such materials.

TABLE I

| Trade Name | Chemical Type | Manufacturer |
|---|---|---|
| (1) Piccotex | | Pennsylvania Industrial Chemicals Co. |
| (2) Piccolyte | Terpene resin | Do. |
| (3) Staybelite 5 | Rosin ester | Hercules Powder Co. |
| (4) Staybelite 10 | do | Do. |
| (5) Piccoumaron | Coumarone | Pennsylvania Industrial Chemicals Co. |
| (6) Piccolastic D150 | Styrene | Do. |
| (7) Piccoflex 100A | Polyvinyl chloride | Do. |
| (8) Neville R13 | Coumarone indene | Neville Chemical Co. |
| (9) Nevillac soft | Phenol modified coumarone indene. | Do. |
| (10) Piccolastic E125 | Styrene | Pennsylvania Industrial Chemicals Co. |
| (11) Piccolastic D125 | do | Do. |
| (12) Picco 75 | Indene | Do. |
| (13) Piccopale 70 | Hydrocarbon (unsaturated). | Do. |
| (14) Piccolastic A-50 | Styrene | Do. |
| (15) Piccolastic A-75 | do | Do. |

Piccolastic A–50 and A–75 are particularly preferred materials for use in connection with the procedures shown in FIGURE 3. Piccolastic A–50 will heat frost at very low temperatures, but formed images are not indefinitely stable. Frost images which otherwise tend to fade can be preserved by overcoating them with a thin film of a more rigid material, preferably one which does not attack the deformable layer. A thin solution of gelatin is quite suitable. A layer of gelatin approximately 1 micron thick applied over a Piccolastic A–50 frost image preserved the image indefinitely whereas without the gelatin the image faded in less than a day. Staybelite 5 and Staybelite 10 are particularly preferred materials for use in other embodiments of the invention although they are subject to hardening with age. These latter materials are chemically polar. It is at least possible that this is a desirable attribute of frostable materials. In general, the above materials can be softened by the application of moderate temperatures which generally do not exceed about 150° F. Thus, Staybelite 10 is useful in the temperature range from about 130°–140° F. It is believed desirable to use materials with such low softening temperatures for best results since it is difficult to find materials which retain the necessary electrical properties at substantially higher softening temperatures.

While many materials are suited for use in this invention, and criteria for their selection have been given, many materials which might appear useful are, in effect, unsatisfactory. Thus, some resins, such as Santolite MS, a rosin ester made by Hercules Powder Company, Acryloid C–10 LV, an acrylic ester made by Rohm & Haas, and ELS 30011, a silicone resin made by Union Carbide, accepts charges substantially less than 300 volts and will not form frost images. Duraplex and D-77B, made by Rohm & Haas will retain a charge for only about two seconds and can be made to frost only with the method of FIGURE 3. Dow Corning Silastic Rubber will not hold a charge nor will it soften. Dow Corning 2,500,000 centistoke silicone oil has what appears to be a potentially suitable viscosity for frosting but will not retain an electrostatic charge. Polyamide resins will not hold a charge. The following vinyl resins, made by Union Carbide, will not soften properly when heated: VMCC, AYAA, VYLF, AYHF. However, ACAC resin, which is believed to be the same as VMCC vinyl chloride acetate resin, except for lower molecular weight, does soften and may be employed.

In addition to the above described materials, there is a further class of useful materials comprising insulating materials which are extremely viscous under normal conditions and which can accordingly be employed for layer 13 without the need of any special softening procedure. Since these materials are highly viscous rather than truly solid, frosted images produced on these materials appear very slowly and then slowly disappear. An example of such a material is sucrose acetate isobutyrate. Such materials are useful where it is desired to form a succession of images without the necessity of intermediate erasure steps. They are particularly useful in connection with the apparatus of FIGURE 3, which in effect forms a sealed chamber.

The frosted images produced in accordance with the present invention have other uses beyond those associated with optical viewing or projecting. Thus, it is well known that even materials which are normally water repellent when in a smooth or shiny surface condition are substantially less water repellent when in a roughened condition. Accordingly, frosted images according to this invention may also be used for such purposes as lithographic printing plates or other forms of planographic printing masters, as well as for relief printing purposes. They have in fact been so used. Thus, for example, a frosted image has been covered with an ink made up of equal parts of Skrip Fountain Pen Ink (W. A. Sheaffer Pen Company, Fort Madison, Iowa), and isopropanol and then pressed against a piece of paper. A legible reproduction of the frosted image was visible on the paper.

Frosted images can also be used in connection with other printing processes such as gravure. Thus, an ink prepared by adding colloidal graphite to a gelatin solution was lightly wiped over a frosted image and allowed to dry for about 10 seconds. The image was then breathed upon and lightly wiped with a facial paper tissue so that the ink was primarily removed in background areas but retained in the frosted areas. When a piece of adhesively coated transparent plastic tape was pressed against the image, it stripped out the ink in image areas and formed a high resolution continuous tone image. Commercial inks and papers can also be employed, and images of different colors can be made. The ink pattern can also be uniformly or selectively transferred by electrostatic forces. Frost images filled with ink or the like are also particularly suitable for viewing or as projectable transparencies and will remain viewable and projectable after the frost pattern disappears or is erased. A frosted image can be copied by applying a softened wax, casting resin, or preferably gelatin, or the like, to the image, hardening and removing thereby forming a replica of the original image. If the replica is carefully made by a casting or copying process which preserves the fine detail, it will have similar optical, printing, and other characteristics as compared to the original. A preferred method is to wipe the image with a thin gelatin solution, dry the gelatin, and strip it off with an optically clear polyethylene terephthalate adhesive tape to form a projectable replica. If the original is first coated with a thin gelatin layer, or is itself chemically resistant, a room temperature vulcanized silicone rubber liquid can be applied to form an accurate replica.

Frosted images can also be used as etching resists or the like, particularly where the deformable material is at least somewhat permeable to the etching medium. A film of Staybelite 10 was coated on brass and frosted in an image configuration. The brass was then exposed to iodine vapor for several hours and the Staybelite film was removed. An etched pattern was formed on the brass which corresponded to the frost pattern.

It has also been found that the electrical properties of a frosted image produced according to the present invention differ in frosted and non-frosted areas. In particular, the frosted areas of deformable layer 13 exhibit a reduced ability to accept or retain electric charge as compared with non-frosted areas. Images according to the present invention can thus be used as masters for electrostatic duplicating procedures. A xerographic plate with a frosted layer 13 thereon may, for example, be placed in the apparatus of FIG. 3 and charged, preferably in the presence of light. The plate may then be developed by conventional electrostatic development procedures as, for example, by pouring over the surface thereof cascade type xerographic developer material available from Xerox Corporation, Rochester, N.Y., or the frosted areas may be detected with an electrometer. As is well known, cascade developer comprises a mixture of finely divided electroscopic toner particles and relatively larger carrier particles upon which the toner particles are adherent. By pouring the developer material over the xerographic plate, it has been found that toner particles preferentially adhere to the plate in non-frosted areas. The toner image may be transferred to a sheet of paper and the steps of charging, developing and transferring may be repeated indefinitely to give rise to a large number of copies prepared from the single frosted image.

It has already been noted that selective frosting in image configuration can be accomplished by selective pre-heating of the deformable layer without selective charging. Other forms of frost imaging may be employed which do not depend on the creation of non-uniform electric fields. A uniformly frosted image may be selectively softened, as in a thermal copier, to cause selective erasure of the frost pattern. Also, a deformable layer which has been put in condition for frosting may be selectively softened to cause selective appearance of the frost pattern. Thus, a deformable layer was applied to a sheet of gold-plated polyethylene terephthalate and was electrostatically charged. A photographic negative was placed over the layer and a photographic strobe light was flashed onto the layer. A frost pattern appeared immediately. Also, a charged layer may be selectively heated sufficiently to dissipate the charge and erase any frosting which may appear and the remaining areas may then be frosted by vapor or normal moderate heating. It should also be noted that frosting need not be used to directly form or reproduce images, but may be used simply to form a novel surface pattern by novel means. It may also be used in printing processes and the like, as by corona charging the deformable layer through stencils, or by transferring charge to the layer from printing type or the like, and then frosting. Finally, it should be noted that the deformable layer can sometimes be applied to a charge pattern, rather than vice versa. Thus, a deformable film may be applied to an image bearing xerographic plate, and the exposed surface of the film brought to ground or other potential through A-C corona or the like. The film may then be softened and frosted.

While the invention has been described in terms of specific manipulations and the like, various modifications thereof will occur to those skilled in the art and there is no intention to be limited except by the scope of the appended claims.

What is claimed is:

1. The method of forming a pattern of frosted areas on a smooth surface comprising:
    forming a thin uniform layer of a rigid electrically insulating material which becomes viscous and deformable upon heating while retaining the ability to support an electrostatic charge, electrostatically charging said layer to a potential above that at which said layer becomes unstable due to the excess of electrostatic repulsive forces over surface tension forces, selectively heating said layer in image configuration to produce a microscopically frosted surface configuration in heated areas, said frosted pattern comprising ridges and valleys randomly positioned with respect to said layer and to said pattern, said ridges and valleys having a substantially uniform average spacing between about the thickness of said layer and about 5 times the thickness of said layer.

2. The method of claim 1 in which said pattern of frosted areas is preserved by cooling said layer after image formation.

No references cited.

NORMAN G. TORCHIN, *Primary Examiner.*

C. E. VAN HORN, *Assistant Examiner.*